(12) United States Patent
Coldren

(10) Patent No.: US 11,118,490 B2
(45) Date of Patent: Sep. 14, 2021

(54) MACHINE SYSTEM FOR CO-PRODUCTION OF ELECTRICAL POWER AND WATER AND METHOD OF OPERATING SAME

(71) Applicant: Caterpillar Inc., Peoria, IL (US)

(72) Inventor: Dana Ray Coldren, Secor, IL (US)

(73) Assignee: Caterpillar Inc., Peoria, IL (US)

( * ) Notice: Subject to any disclaimer, the term of this patent is extended or adjusted under 35 U.S.C. 154(b) by 51 days.

(21) Appl. No.: 16/752,555

(22) Filed: Jan. 24, 2020

(65) Prior Publication Data
US 2021/0231037 A1    Jul. 29, 2021

(51) Int. Cl.
| | |
|---|---|
| *F01N 3/00* | (2006.01) |
| *F01N 3/04* | (2006.01) |
| *F02B 63/04* | (2006.01) |
| *F01N 3/033* | (2006.01) |
| *F01N 3/28* | (2006.01) |
| *F01N 3/02* | (2006.01) |
| *B01D 53/00* | (2006.01) |
| *F01N 3/035* | (2006.01) |

(Continued)

(52) U.S. Cl.
CPC ............ *F01N 3/005* (2013.01); *B01D 53/002* (2013.01); *C02F 1/16* (2013.01); *F01N 3/0205* (2013.01); *F01N 3/033* (2013.01); *F01N 3/035* (2013.01); *F01N 3/043* (2013.01); *F01N 3/055* (2013.01); *F01N 3/2889* (2013.01); *F02B 63/042* (2013.01); *C02F 2201/008* (2013.01); *C02F 2201/009* (2013.01); *F01N 2240/02* (2013.01); *F01N 2240/22* (2013.01); *F01N 2250/02* (2013.01); *F01N 2250/10* (2013.01); *F01N 2260/024* (2013.01); *F01N 2570/22* (2013.01); *F02B 2201/02* (2013.01)

(58) Field of Classification Search
CPC .......... F01N 3/005; F01N 3/055; F01N 3/035; F01N 3/033; F01N 3/043; F01N 3/2889; F01N 3/0205; F01N 2570/22; F01N 2250/10; F01N 2250/02; F01N 2240/02; F01N 2240/22; F01N 2260/024; B01D 53/002; C02F 1/16; C02F 2201/008; F02B 63/042; F02B 2201/02
See application file for complete search history.

(56) References Cited

U.S. PATENT DOCUMENTS

| | | | | |
|---|---|---|---|---|
| 3,905,784 A | * | 9/1975 | Kelleher | ............... F01N 3/0205 95/156 |
| 4,313,305 A | * | 2/1982 | Egosi | ..................... F22B 3/045 60/648 |

(Continued)

*Primary Examiner* — Mark A Laurenzi
*Assistant Examiner* — Mickey H France
(74) *Attorney, Agent, or Firm* — Brannon Sowers & Cracraft

(57) ABSTRACT

Operating a machine system for co-production of electrical power and filtered potable water includes operating an electrical generator by way of rotation of an engine output shaft to produce electrical power, and collecting water condensed from cooled treated exhaust from the engine for delivery to an outgoing water conduit. Operating the machine system further includes supplying electrical power produced by the electrical generator to an in situ electrical load, and to at least one ex situ electrical load such as a power grid. The in situ electrical load is produced by at least one of an exhaust conveyance device, an air conveyance device, or a water conveyance device in a water subsystem.

18 Claims, 2 Drawing Sheets

(51) Int. Cl.
*F01N 3/05* (2006.01)
*C02F 1/16* (2006.01)

(56) References Cited

U.S. PATENT DOCUMENTS

| | | | |
|---|---|---|---|
| 4,406,118 A * | 9/1983 | Funk | C10J 3/06 60/39.183 |
| 4,656,831 A | 4/1987 | Budininkas et al. | |
| 6,357,227 B1 * | 3/2002 | Neufert | F01N 3/02 60/309 |
| 6,581,375 B2 | 6/2003 | Jagtoyen et al. | |
| 6,845,738 B2 * | 1/2005 | Frutschi | F02B 29/0493 123/25 C |
| 6,863,711 B2 * | 3/2005 | Tongue | B01D 53/0462 95/10 |
| 6,895,746 B2 * | 5/2005 | Buglass | F01N 3/0807 60/286 |
| 6,978,772 B1 * | 12/2005 | Dorn | F02M 26/31 123/568.12 |
| 7,302,795 B2 * | 12/2007 | Vetrovec | F01N 5/02 60/309 |
| 8,015,809 B2 * | 9/2011 | Watson | F02B 37/001 60/605.2 |
| 8,021,542 B2 | 9/2011 | Kirts | |
| 8,281,577 B2 * | 10/2012 | Tanoura | C01B 3/508 60/301 |
| 8,573,144 B2 * | 11/2013 | Lewis | F01N 3/05 111/174 |
| 8,587,136 B2 | 11/2013 | Williams | |
| 9,739,187 B2 * | 8/2017 | Miyairi | F02M 25/0222 |
| 9,790,852 B2 * | 10/2017 | Ito | F01N 3/005 |
| 9,856,769 B2 * | 1/2018 | Baker | B01D 53/1475 |
| 10,082,059 B2 | 9/2018 | Borla | |
| 10,501,337 B2 * | 12/2019 | Yong | C02F 1/66 |
| 10,774,733 B2 * | 9/2020 | Scuderi | F02B 35/00 |
| 2003/0121253 A1 * | 7/2003 | Ford | F01N 3/005 60/310 |
| 2003/0221413 A1 * | 12/2003 | Buglass | B01D 53/9431 60/275 |
| 2004/0182330 A1 * | 9/2004 | Frutschi | F01K 21/047 123/25 A |
| 2007/0006571 A1 * | 1/2007 | Vetrovec | F01N 5/02 60/281 |
| 2007/0137590 A1 * | 6/2007 | Vetrovec | F02B 37/00 123/25 A |
| 2009/0277418 A1 * | 11/2009 | Leone | F02M 25/0227 123/25 R |
| 2010/0176064 A1 * | 7/2010 | Batty | B01D 5/0012 210/737 |
| 2011/0000191 A1 * | 1/2011 | Scappatura | B01D 45/16 60/274 |
| 2011/0061528 A1 * | 3/2011 | Taylor | F23J 15/06 95/64 |
| 2011/0139050 A1 * | 6/2011 | Lewis | F01N 3/055 111/174 |
| 2011/0168128 A1 * | 7/2011 | Bradley | F01N 3/005 123/294 |
| 2012/0272657 A1 * | 11/2012 | Baker | F23C 9/00 60/772 |
| 2013/0058853 A1 * | 3/2013 | Baker | F02C 3/34 423/228 |
| 2014/0060013 A1 * | 3/2014 | Dunn | F02M 25/12 60/278 |
| 2014/0083084 A1 * | 3/2014 | Fukuda | F02D 41/042 60/284 |
| 2015/0128622 A1 * | 5/2015 | Filippone | F01N 5/02 62/79 |
| 2016/0003116 A1 * | 1/2016 | Terada | F01N 1/02 60/312 |
| 2016/0138433 A1 * | 5/2016 | Janicki | F23G 5/04 60/671 |
| 2016/0146163 A1 * | 5/2016 | Takada | F02M 25/0222 123/568.12 |
| 2016/0222856 A1 * | 8/2016 | Kato | F01N 3/208 |
| 2016/0251991 A1 * | 9/2016 | Randall | B01D 53/79 60/282 |
| 2016/0333757 A1 * | 11/2016 | Miyairi | F02B 47/02 |
| 2017/0082000 A1 * | 3/2017 | Borla | F01N 5/025 |
| 2017/0183996 A1 * | 6/2017 | Baker | F02C 6/18 |
| 2018/0128136 A1 * | 5/2018 | Sharp | F01N 3/2066 |
| 2018/0215632 A1 * | 8/2018 | Curlett | B01D 1/16 |
| 2018/0371954 A1 * | 12/2018 | Copeland | F02G 5/04 |
| 2019/0048769 A1 * | 2/2019 | Eriksson | F01N 3/021 |
| 2019/0107280 A1 * | 4/2019 | Boudreault | C01B 32/50 |
| 2019/0120131 A1 * | 4/2019 | Scuderi | F25B 15/06 |
| 2019/0234264 A1 * | 8/2019 | Okami | F01N 13/1888 |
| 2020/0056564 A1 * | 2/2020 | Bauer | F02C 6/006 |
| 2020/0116065 A1 * | 4/2020 | Leal Ribeiro | B01D 53/18 |
| 2020/0132022 A1 * | 4/2020 | Monti | F02M 25/0221 |
| 2020/0271050 A1 * | 8/2020 | Dunn | C01B 13/0259 |

* cited by examiner

MACHINE SYSTEM FOR CO-PRODUCTION OF ELECTRICAL POWER AND WATER AND METHOD OF OPERATING SAME

TECHNICAL FIELD

The present disclosure relates generally to a machine system for co-production of electrical power and water, and more particularly to operating equipment in a water subsystem condensing water from engine exhaust, using electrical power produced by an electrical generator operated by the engine.

BACKGROUND

Provision of resources to remote work locations, underdeveloped regions of the world, or other regions experiencing natural or manmade disasters has long been challenging to governments, business entities, and non-governmental organizations. Many such regions rely upon local grids subject to supply interruptions for electrical power, and thus consistent electrical power is sometimes unavailable. Various mobile electrical power units, mobile field hospitals, and temporary infrastructure apparatus are known which can theoretically be deployed on an as-needed basis. Engineers and other persons skilled in the field of disaster relief are routinely developing new technologies and strategies ranging from portable generators, to repurposed ISO containers for housing and medical treatment, and deployable water filtration systems. Despite continued research and development in these areas, there remain compelling needs for improved strategies and apparatus for providing resources to military and civilian personnel, aid workers, and others in remote or disaster-stricken locales. One example of a mobile power system having trailer mounted components is set forth in U.S. Pat. No. 8,587,136 to Williams.

SUMMARY OF THE INVENTION

In one aspect, a method of operating a machine system for co-production of electrical power and water includes combusting fuel and air in an engine to rotate an engine output shaft, and feeding exhaust from the engine through an exhaust aftertreatment subsystem. The method further includes feeding treated exhaust from the exhaust aftertreatment subsystem through a water subsystem, cooling the treated exhaust in the water subsystem, and collecting water condensed from the cooled treated exhaust for delivery to an outgoing water conduit. The method still further includes operating an electrical generator by way of the rotation of the engine output shaft to produce electrical power, supplying electrical power produced by the operation of the electrical generator to an in situ electrical load in the water subsystem, and supplying a net of electrical power produced by the operation of the electrical generator to at least one ex situ electrical load.

In another aspect, a method for co-production of electrical power and water in a machine system includes coupling a water subsystem to an exhaust aftertreatment subsystem for an engine in a machine system, and coupling an electrical generator in the machine system to an in situ electrical load in the water subsystem, and to at least one ex situ electrical load. The method further includes operating the electrical generator with the engine, treating exhaust from the engine in the exhaust aftertreatment subsystem, and cooling the treated exhaust in the water subsystem to condense water from the treated exhaust. The method still further includes supplying water condensed from the treated exhaust to an outgoing water conduit, and supplying electrical power produced by the operation of the electrical generator to the in situ electrical load, and to at least one ex situ electrical load.

In still another aspect, a machine system for co-production of electrical power and water includes an internal combustion engine having an engine output shaft, an electrical generator coupled with the engine output shaft, and an exhaust aftertreatment subsystem including an exhaust filter and a catalytic treatment device. The machine system further includes a water subsystem coupled with the exhaust aftertreatment system including a heat exchanger, a condenser, a condensed water collector, a water filter, and an outgoing water conduit. At least one of the heat exchanger, the condenser, or the condensed water collector includes an electric motor. The machine system still further includes electrical cabling including a first node for supplying electrical power from the electrical generator to an in situ electrical load produced by the electric motor, and a second node for supplying a net of electrical power from the electrical generator to at least one ex situ electrical load.

DETAILED DESCRIPTION

Figure 1:
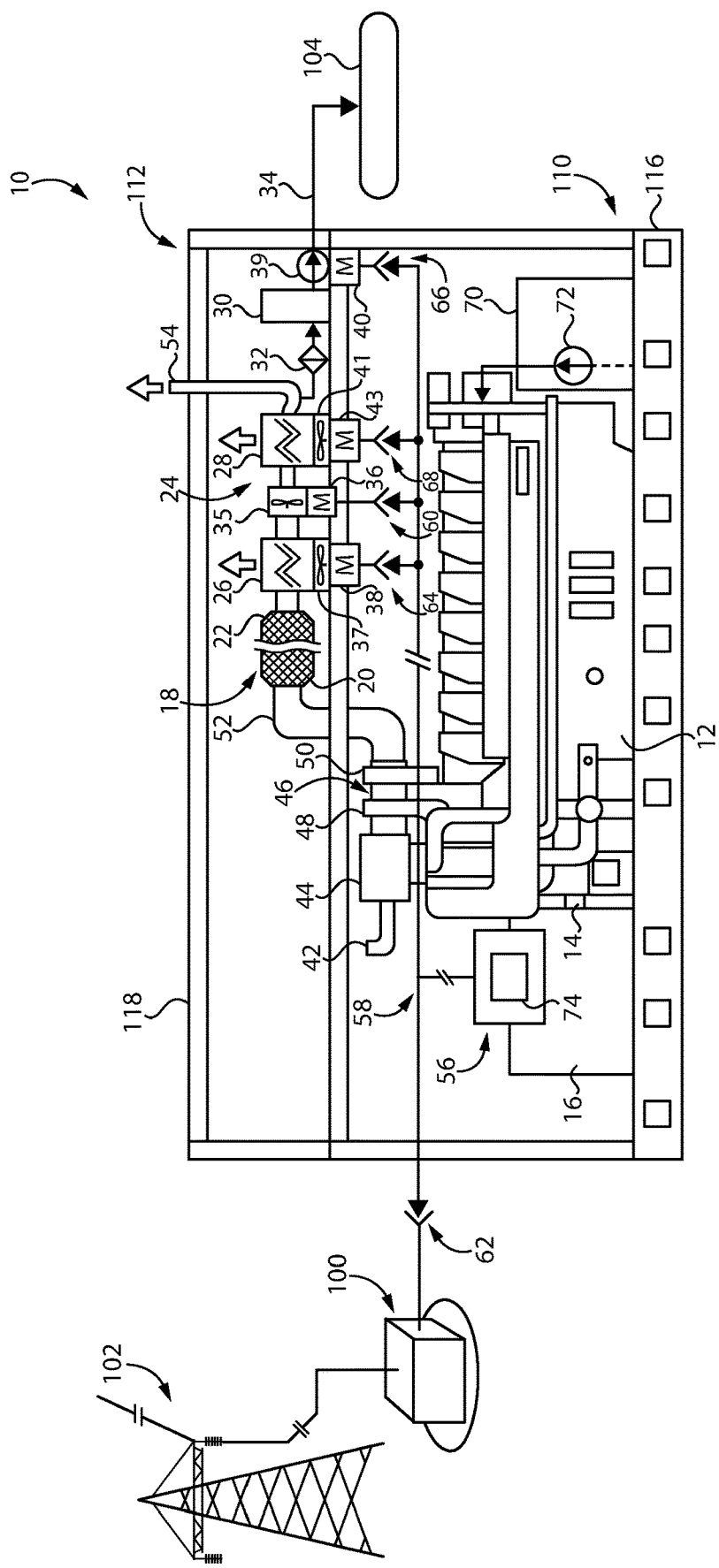
FIG. 1 is a diagrammatic view of a machine system, according to one embodiment.

Referring to FIG. 1, there is shown a machine system 10 for co-production of electrical power and water, according to one embodiment. Machine system 10 can be deployed at a remote work location, in a disaster-stricken area, or in another application where provision of both electrical power and potable water is desirable, although the present disclosure is not limited to any particular regional or situational application. Machine system 10 includes an internal combustion engine 12 having an engine output shaft 14. Internal combustion engine 12 (hereinafter "engine 12") may include a multi-cylinder compression-ignition liquid-fuel engine, such as a diesel engine, although the present disclosure is not thereby limited. In other instances, engine 12 could include a spark-ignited or prechamber-ignited gasoline or natural gas engine, a liquid fuel engine operated on biodiesel or a blended liquid fuel, a dual fuel engine, or still another type of combustion engine.

Engine output shaft 14 can include a driveshaft coupled with a crankshaft, or any other prime mover structured to rotate in response to reciprocation of pistons within combustion cylinders in engine 12 to rotate a crankshaft. Machine system 10 also includes an electrical generator 16 coupled with engine output shaft 14 in a generally known manner, and operated to rotate in response to rotation of engine output shaft 14 to produce electrical power. Machine system 10 also includes an exhaust aftertreatment subsystem 18 having an exhaust filter 20 and a catalytic exhaust treatment device 22, for instance. In a practical implementation, exhaust filter 20 includes a particulate filter structured to trap particulate matter in the nature of soot and ash carried in a flow of exhaust from engine 12. Exhaust filter 20 can be actively or passively regenerated. Catalytic exhaust treatment device 22 can include any of a variety of catalytic treatment devices including, for example, precious metal catalysts or base metal catalysts, and structured to trap and/or transform certain emissions in exhaust from engine 12. Catalytic exhaust treatment device 22 could be positioned upstream of exhaust filter 20, or downstream of exhaust filter 20 approximately as shown. Catalytic exhaust treatment device 22 can include one or more of a diesel oxidation catalyst or DOC, a selective catalytic reduction module or SCR, or a variety of other catalytic exhaust treatment devices packaged singly or together, and trapping certain undesirable exhaust constituents or transforming them into less problematic materials.

Engine 12 further includes a fresh air inlet 42 structured to receive a flow of intake air for combustion, and passed through an air filter 44. Engine 12 also includes a turbocharger 46 having a compressor 48 that receives the flow of intake air, and a turbine 50 that is rotated by way of exhaust from engine 12 to rotate compressor 48 in a generally known manner. Engine 12 also includes, or is coupled with, a fuel tank 70 including one or more fuel pumps 72 to feed fuel for combustion with air to cylinders in engine 12. As noted above, engine 12 may be a liquid-fuel engine, and fuel tank 70 can be structured to store up to several hundred gallons of liquid fuel, such as diesel fuel, or potentially an even greater quantity.

Machine system 10 also includes a water subsystem 24 coupled with exhaust aftertreatment subsystem 18. Water subsystem 24 includes a heat exchanger 26, a condenser 28, a condensed water collector 30 such as a water tank, one or more water filters 32, and an outgoing water conduit 34. Outgoing water conduit 34 may be structured to supply potable water from machine system 10 for human or animal consumption, fire suppression, or any other purpose. Outgoing water conduit 34 may connect to a local water distribution network 104, such as a local water utility or any suitable above ground or buried water supply or storage infrastructure.

In the illustrated embodiment, machine system 10 is configured in a machine system package 110 including engine 12 and electrical generator 16, and a common support frame 116 supporting engine 12 and electrical generator 16. Machine system package 110 may further include exhaust aftertreatment subsystem 18, and water subsystem 24. Common support frame 116 may include a skid or the like having engine 12 and electrical generator 16 mounted and fastened thereon. In alternative embodiments common support frame 116 could include a flatbed trailer, a rail car, or the like with engine 12 and electrical generator 16 attached, or simply mounted, thereon. Machine system package 110 may also include an auxiliary package 120 that includes exhaust aftertreatment subsystem 18, water subsystem 24, and an auxiliary support frame 118. Embodiments are contemplated where auxiliary package 112 is transported to a location where auxiliary package 112 can be mounted upon, attached to, or otherwise coupled with common support frame 116, such as by stacking approximately as shown in FIG. 1. In some instances, auxiliary package 112 could be delivered as add-on equipment for an engine-generator set already in place at an electric power and water production location, or transported there separately. It is envisioned that installations or localities having one or more existing engine-generator sets already in service for electrical power production can be retrofitted with auxiliary package 112 including water subsystem 24, or components of auxiliary package 112, for co-production of electrical power and water, as further discussed herein.

At least one of heat exchanger 26, condenser 28, and condensed water collector 30 may include or be coupled with an electric motor. It is further contemplated that water subsystem 24 may also include one or more of an exhaust conveyance device, an air conveyance device, or a water conveyance device, the one or more of which is powered by one or more electric motors. In the illustrated embodiment water subsystem 24 has an exhaust conveyance device that includes an exhaust blower 35. Exhaust blower 35 includes a blower electric motor 36. Water subsystem 24 also has an air conveyance device that includes an air fan 37 of heat exchanger 26 having a fan electric motor 38. Water subsystem 24 still further has a water conveyance device that includes a condensed water boost pump 39 having a pump electric motor 39. Another air conveyance device in the nature of a condenser fan 41 having a condenser fan electric motor 43 may also be part of water subsystem 24. An exhaust conduit 52 extends between engine 12 and an exhaust stack 54, with each of exhaust aftertreatment subsystem 18 and water subsystem 24 forming a segment of exhaust conduit 52.

Machine system 10 further includes electrical cabling 58 for supplying electrical power from electrical generator 16 to various target electrical loads. Electrical cabling 58, which could include a pre-configured wiring harness, includes a first node 60 for supplying electrical power from electrical generator 16 to an in situ electrical load produced by the electric motor associated with at least one of heat exchanger 26, condenser 28, or condensed water collector 30 as noted above. In a practical implementation, first node 60 supplies electrical power to blower electric motor 36. Electrical cabling 58 also includes a second node 62 for supplying a net of electrical power from electrical generator 16 to at least one ex situ electrical load. Electrical generator 16 may also include electrical power circuitry 74 as part of an on-board electrical system 56 native to the engine-generator set formed by engine 12 and electrical generator 16, or provided as part of an add-on with other equipment as discussed herein. Second node 62 may electrically connect with a local electric utility grid 102, such as by way of an electrical substation 100 or the like. In other embodiments, the at least one ex situ electrical load could include additional machinery located at the same work site or area as machine system 10, for example, a pump, a compressor, lights, industrial or construction machinery, hospital equipment or various other types of equipment. It will thus be understood that the at least one ex situ electrical load can be produced by many different types of electrical equipment, or merely by electrical infrastructure such as a local or regional electric power grid. Ex situ means not part of systems or subsystems used in the operation of machine system 10 to produce electrical power and water. In situ has a generally opposite meaning to ex situ.

It will also be recalled that electrical cabling 58 connects electrical generator 16 to one or more in situ electrical loads produced by one or more electric motors. Electrical cabling 58 may further include a third node 64 electrically connecting to fan electric motor 38, a fourth node 66 electrically connecting to pump electric motor 40, and a fifth node 68 electrically connecting to fan electric motor 43 of condenser fan 41. Condenser 28 will also typically include an electrically powered compressor, which in some instances may be the largest or one of the largest in situ electrical loads. Electrical power circuitry 74 may include converters, rectifiers, inverters, switches, transformers, and/or other power control and/or conditioning circuitry, for providing a flow of electrical power at suitable voltage, current, phase, frequency, etc., to the one or more in situ electrical loads and the one or more ex situ electrical loads as discussed herein. The net electrical power supply from electrical generator 16 to electrical power grid 102 may be a net electrical power after powering on-board equipment including electrical loads of water subsystem 24, engine 12, or others, transmission losses, heat losses, et cetera.

INDUSTRIAL APPLICABILITY

Figure 2:
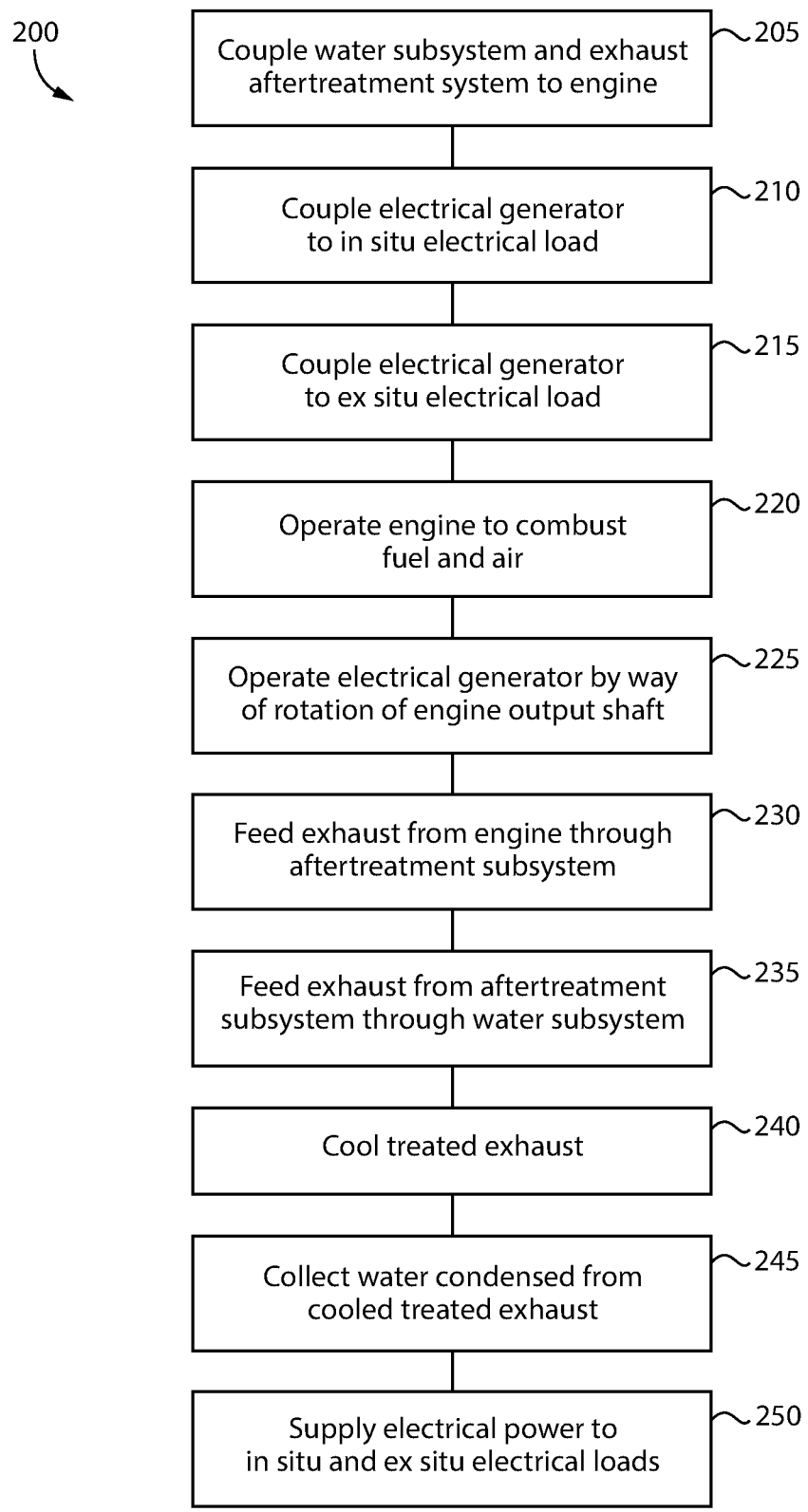
FIG. 2 is a flowchart illustrating example methodology, according to one embodiment.

Referring now also to FIG. 2, there is shown a flowchart 200 illustrating example operating methodology for machine system 10 according to one embodiment. At a block 205 water subsystem 24 and exhaust aftertreatment subsystem 18 are coupled to engine 12. Coupling water subsystem 24 and exhaust aftertreatment subsystem 18 to engine 12 can include installing auxiliary package 112, and connecting exhaust conduit 52 to engine 12, or to a preexisting exhaust conduit or resident aftertreatment components already in service on engine 12. Coupling water subsystem 24 and exhaust aftertreatment subsystem 18 to engine 12 could also include physically and fluidly connecting stand-alone components of water subsystem 24 and exhaust aftertreatment subsystem 18 not provided in a package. Exhaust aftertreatment subsystem 18 could be in whole or in part comprised of components already in service on engine 12.

From block 205 flowchart 200 advances to a block 210 to couple electrical generator 16 to the in situ electrical load in water subsystem 24. Coupling electrical generator to the in situ electrical load can include connecting cabling 58 to one or more electric motors by way of nodes 60, 64, 66, 68, as discussed herein. From block 210 flowchart 200 advances to a block 215 to couple electrical generator 16 to the ex situ electrical load, such as by electrically connecting electrical generator 16 to substation 100 by way of node 62. From block 215 flowchart 200 advances to a block 220 to operate engine 12 to combust fuel and air, and then to a block 225 to operate electrical generator 16 by way of rotation of engine output shaft 14.

From block 225 flowchart 200 advances to a block 230 to feed exhaust from engine 12 through aftertreatment subsystem 18, and then to a block 235 to feed exhaust from aftertreatment subsystem 18 through water subsystem 24. Exhaust conveyed through exhaust filter 20 and catalytic exhaust treatment device 22 may be treated by removal of particulates and transformation of certain exhaust constituents into less undesirable constituents, such as the reduction of oxides of nitrogen to molecular nitrogen and water. A suitable diesel emission fluid (DEF) such as urea water, can be injected into exhaust conduit 52 upstream of catalytic exhaust treatment device 22.

The treated exhaust from exhaust treatment device 22 is then fed through heat exchanger 26 where the treated exhaust is cooled, as in a block 240. Heat exchanger 26 can be an exhaust-to-air heat exchanger, having heat exchange surfaces cooled by a flow of cooling air provided by fan 37. Prior to, during, or as illustrated in FIG. 1 after, cooling of treated exhaust in heat exchanger 26, a flow of treated exhaust to condenser 28 is boosted by way of boost blower 35. The flow of exhaust boosted by blower 35 is then fed through condenser 28, exchanging heat for example with a flow of air provided by fan 41 to further cool the exhaust, and then fed towards exhaust stack 54 for discharging the cooled, treated, and dried exhaust.

Water vapor in condenser 28 will undergo a phase change, and then flows in liquid form, for example under the force of gravity, toward and is eventually delivered into outgoing water conduit 34. The condensed water can be filtered in a filter 32, and collected in condensed water collector 30, as shown at a block 245. Condensed water boost pump 39 may be operated to deliver water into and pump it through outgoing water conduit 34, boosting at least one of a pressure or a flow of the water. Boost pump 39, or another pump, could also be used to pressurize water collector 30 in some embodiments, for instance by positioning boost pump 39 upstream of water collector 30 and downstream of condenser 28. It should also be appreciated that additional filtration stages, water pumping stages, and boosting of exhaust flow by way of blowers at additional or alternative locations could be implemented in other embodiments. Electrical power is supplied to the in situ and ex situ electrical loads at a block 250, and can be supplied to those loads essentially whenever electrical generator 16 is operated to produce electrical power.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. For instance, while the present disclosure emphasizes implementation of machine system 10 in a stationary application where engine 12 and electrical generator 16 are not part of a larger machine, in other instances an engine-generator set in a propulsion system of a track or tractor, or even a marine vessel, could be utilized according to the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed:

1. A method of operating a machine system for co-production of electrical power and water comprising:
    combusting fuel and air in an engine to rotate an engine output shaft;
    feeding exhaust from the engine through an exhaust aftertreatment subsystem;
    feeding treated exhaust from the exhaust aftertreatment subsystem through a water subsystem;
    cooling the treated exhaust in the water subsystem;
    collecting water condensed from the cooled treated exhaust for delivery to an outgoing water conduit;
    operating an electrical generator by way of the rotation of the engine output shaft to produce electrical power;
    supplying electrical power produced by the operation of the electrical generator to an in situ electrical load in the water subsystem;
    supplying a net of electrical power produced by the operation of the electrical generator to at least one ex situ electrical load; and
    wherein the cooling of the treated exhaust includes cooling the treated exhaust in a heat exchanger and in a condenser, and further comprising boosting a flow of the treated exhaust to the condenser.

2. The method of claim 1 wherein the supplying of electrical power to an in situ electrical load includes supplying electrical power to an electric motor in at least one of an exhaust conveyance device, an air conveyance device, or a water conveyance device.

3. The method of claim 2 wherein the combusting of fuel and air further includes combusting a liquid fuel and air in a stationary engine-generator set including the engine, the electrical generator, and a common support frame for the engine and the electrical generator.

4. The method of claim 2 wherein the supplying of electrical power to an electric motor further includes supplying electrical power to an exhaust boost blower.

5. The method of claim 2 wherein the supplying of electrical power to an electric motor further includes supplying electrical power to a collected water boost pump, and further comprising filtering the water collected from the cooled treated exhaust.

6. The method of claim 1 wherein the supplying of a net of electrical power to at least one ex situ electrical load further includes supplying the net of electrical power to an electric utility grid.

7. A method for co-production of electrical power and water in a machine system comprising:
coupling a water subsystem to an exhaust aftertreatment subsystem for an engine in a machine system;
coupling an electrical generator in the machine system to an in situ electrical load in the water subsystem, and to at least one ex situ electrical load;
operating the electrical generator with the engine;
treating exhaust from the engine in the exhaust aftertreatment subsystem;
boosting a flow of the treated exhaust to the water subsystem;
cooling the treated exhaust in the water subsystem to condense water from the treated exhaust;
supplying water condensed from the treated exhaust to an outgoing water conduit; and
supplying electrical power produced by the operation of the electrical generator to the in situ electrical load, and to at least one ex situ electrical load.

8. The method of claim 7 wherein the coupling of a water subsystem to an exhaust aftertreatment subsystem further includes coupling a water subsystem package to an engine-generator set package at an electrical power and water production location.

9. The method of claim 7 wherein the supplying of electrical power to the in situ electrical load includes supplying electrical power to electric motors of each of an exhaust conveyance device, an air conveyance device, and a water conveyance device.

10. The method of claim 9 wherein:
the supplying of water condensed from the exhaust to an outgoing water conduit includes supplying water to an outgoing water conduit connected to a water distribution network; and
the supplying of electrical power to at least one ex situ electrical load includes supplying a net of electrical power produced by the electrical generator to an electric utility grid.

11. The method of claim 9 wherein the cooling of the treated exhaust further includes cooling the treated exhaust in a heat exchanger and in a condenser.

12. The method of claim 11 wherein the supplying of electrical power to the in situ electrical load includes supplying electrical power to an electric motor of an air fan of the heat exchanger.

13. The method of claim 11 further comprising boosting a flow of the treated exhaust to the condenser, and wherein the supplying of the electrical power to the in situ electrical load includes supplying electrical power to an electric motor of an exhaust boost blower.

14. The method of claim 9 further comprising boosting at least one of a pressure or a flow of water to the outgoing water conduit, and wherein the supplying of electrical power to the in situ electrical load includes supplying electrical power to an electric motor of a condensed water boost pump.

15. A machine system for co-production of electric power and water comprising:
an internal combustion engine having an engine output shaft; an electrical generator coupled with the engine output shaft; an exhaust aftertreatment subsystem including an exhaust filter and a catalytic exhaust treatment device;
a water subsystem coupled with the exhaust aftertreatment system and including a heat exchanger, a condenser, a condensed water collector, a water filter, and an outgoing water conduit, and at least one of the heat exchanger, the condenser, or the condensed water collector including an electric motor;
electrical cabling including a first node for supplying electrical power from the electrical generator to an in situ electrical load produced by the electric motor, and a second node for supplying a net of electrical power from the electrical generator to at least one ex situ electrical load; and
a machine system package including the engine and the electrical generator, wherein the machine system package further includes the exhaust aftertreatment subsystem, the water subsystem, and a common support frame.

16. The machine system of claim 15
wherein the engine includes a compression-ignition internal combustion liquid-fuel engine.

17. The machine system of claim 15 wherein the water subsystem further includes an exhaust conveyance device, an air conveyance device, at least one water filter structured to filter the water to a potable state, and a water conveyance device.

18. The machine system of claim 17 further comprising:
an exhaust conduit extending between the engine and an exhaust stack, and wherein each of the exhaust aftertreatment subsystem and the water subsystem forms a segment of the exhaust conduit;
the exhaust conveyance device includes an exhaust boost blower and the electric motor includes a blower electric motor of the exhaust boost blower;
the air conveyance device includes an air fan of the heat exchanger, having a fan electric motor;
the water conveyance device includes a condensed water boost pump, having a pump electric motor; and
the electrical cabling further includes a third node and a fourth node for supplying, respectively, electrical power to the fan electric motor and the pump electric motor.

* * * * *